United States Patent
Tuuliainen

(10) Patent No.: US 10,919,609 B2
(45) Date of Patent: Feb. 16, 2021

(54) PROPELLER DRIVE ASSEMBLY AND A SCREW PUMP FOR A WATER VESSEL

(71) Applicant: AB VOLVO PENTA, Gothenburg (SE)

(72) Inventor: Peter Tuuliainen, Köping (SE)

(73) Assignee: AB VOLVO PENTA, Gothenburg (SE)

( * ) Notice: Subject to any disclaimer, the term of this patent is extended or adjusted under 35 U.S.C. 154(b) by 321 days.

(21) Appl. No.: 15/768,578

(22) PCT Filed: Nov. 2, 2015

(86) PCT No.: PCT/SE2015/051150
§ 371 (c)(1),
(2) Date: Apr. 16, 2018

(87) PCT Pub. No.: WO2017/078579
PCT Pub. Date: May 11, 2017

(65) Prior Publication Data
US 2019/0054991 A1    Feb. 21, 2019

(51) Int. Cl.
*B63H 20/14* (2006.01)
*B63H 23/00* (2006.01)
(Continued)

(52) U.S. Cl.
CPC ........... *B63H 21/386* (2013.01); *B63H 20/14* (2013.01); *B63H 21/38* (2013.01); *B63H 23/04* (2013.01);
(Continued)

(58) Field of Classification Search
CPC ...... B63H 20/00; B63H 20/003; B63H 20/02; B63H 20/14; B63H 21/38; B63H 21/386;
(Continued)

(56) References Cited

U.S. PATENT DOCUMENTS

| 4,764,135 A | 8/1988 | McCormick |
| 5,020,635 A | 6/1991 | Lunn |

(Continued)

FOREIGN PATENT DOCUMENTS

| CN | 2554089 Y | 6/2003 |
| CN | 102069902 A | 5/2011 |

(Continued)

OTHER PUBLICATIONS

First Office Action issued in corresponding Chinese Patent Application No. 201580084317.0, dated Sep. 19, 2019.
(Continued)

*Primary Examiner* — Daniel V Venne
(74) *Attorney, Agent, or Firm* — Venable LLP; Jeffri A. Kaminski

(57) ABSTRACT

A propeller drive assembly includes a driveshaft for transferring a torque between an engine and a propeller of a water surface vessel, and a housing enclosing the driveshaft. The assembly includes, separately from the driveshaft, a first element and a second element, the first element extending through a first bore of the second element, wherein one of the first and second elements is fixed to the driveshaft and the other of the first and second elements is arranged to be stationary in relation to the housing, and the one of the first and second elements which is fixed to the driveshaft presents in the first bore a first elongated cavity forming a first helix along the first bore, so as to form with the other of the first and second elements a screw pump.

15 Claims, 4 Drawing Sheets

(51) Int. Cl.
  *B63H 21/38* (2006.01)
  *B63H 23/04* (2006.01)
  *F04D 3/02* (2006.01)
  *F04D 13/02* (2006.01)
  *F16H 57/04* (2010.01)

(52) U.S. Cl.
  CPC ............... *F04D 3/02* (2013.01); *F04D 13/02* (2013.01); *F16H 57/0436* (2013.01)

(58) Field of Classification Search
  CPC ........ B63H 23/00; B63H 23/02; B63H 23/04; F04D 3/02; F04D 13/02; F16H 57/0436
  USPC ............................ 440/75, 76, 78, 83, 84, 86
  See application file for complete search history.

(56) References Cited

U.S. PATENT DOCUMENTS

| | | | | |
|---|---|---|---|---|
| 7,494,391 | B2 * | 2/2009 | Okabe | .................. B63H 20/002 440/83 |
| 8,864,537 | B1 | 10/2014 | Wiatrowski | |
| 9,926,057 | B1 * | 3/2018 | Brodtke | .................. B63H 1/12 |
| 2008/0009207 | A1 | 1/2008 | Okabe | |
| 2012/0329346 | A1 | 12/2012 | Beachy | |
| 2013/0052891 | A1 | 2/2013 | Yoshigasaki | |
| 2013/0273792 | A1 | 10/2013 | Davis et al. | |

FOREIGN PATENT DOCUMENTS

| | | |
|---|---|---|
| JP | S57182595 A | 11/1982 |
| SE | 420120 B | 9/1981 |

OTHER PUBLICATIONS

International Search Report (dated Jul. 15, 2016) for corresponding International App. PCT/SE2015/051150.

European Official Action (dated May 13, 2019) for corresponding European App. 15907896.3.

* cited by examiner

PROPELLER DRIVE ASSEMBLY AND A SCREW PUMP FOR A WATER VESSEL

BACKGROUND AND SUMMARY

The invention relates to a propeller drive assembly, the assembly comprising a driveshaft for transferring a torque between an engine and a propeller of a water surface vessel, and a housing enclosing the driveshaft. The invention also relates to a water surface vessel and a screw pump.

Propeller drive assembly with driveshafts for transferring a torque between an engine and a propeller of a water surface vessel typically hold oil for lubrication of moving parts in the assembly. To counteract the force of gravity, such assemblies may include devices for moving the oil from lower to higher portions of the assembly. US2013273792A1 and US2012329346A1 disclose screw pumps in propeller drive assemblies where a non-horizontal driveshaft is provided with an external screw shape for pumping oil upwards along the driveshaft. A problem with such solutions is that the driveshaft, which has to be designed according to a number of requirements, in addition has to be provided with the external screw shape, which makes manufacturing of the driveshaft more demanding and costly.

US8864537B1 discloses a propeller drive assembly where a pump is formed by a driveshaft and a stationary pump housing which is disposed inside a driveshaft passage. The pump housing defines an internal thread, and as the driveshaft rotates, lubricant is caused to move up inside the thread. A disadvantage with this solution is that since the thread is provided in a stationary part and the moving part of the pump has a smooth surface, the pump will present a low efficiency.

It is desirable to make oil pumping in water surface vessel propeller drive assemblies possible with a high pumping efficiency, while keeping manufacturing complexity added due to the pumping requirement low.

According to an aspect of the invention, a propeller drive assembly is provided, the assembly comprising
a driveshaft for transferring a torque between an engine and a propeller of a water surface vessel,
and
a housing enclosing the driveshaft,
wherein the assembly further comprises, separately from the driveshaft, a first element and a second element, the first element extending through a first bore of the second element,
wherein one of the first and second elements is fixed to the driveshaft and the other of the first and second elements is arranged to be stationary in relation to the housing, and
the one of the first and second elements which is fixed to the driveshaft presents in the first bore a first elongated cavity forming a first helix along the first bore, so as to form with the other of the first and second elements a screw pump.

Thus, a screw pump, which may be referred to as an Archimedean screw pump, is provided in the propeller drive assembly, which pump is arranged to pump oil upwards along the driveshaft. This is useful during normal operation as well as during sailing, i.e. when the engine is shut down, but the vessel is moving, e.g. by propulsion of another engine and another propeller. Thus, during sailing, the vessel may be propelled in the water, and simultaneously, while the engine is shut down, the driveshaft is allowed to be driven by the propeller, thereby allowing the pump to be driven by the driveshaft. During sailing, heat caused by friction might occur, e.g. in bearings, clutch discs and/or seals, and the oil transportation provided by the screw pump may counteract such heating and provide lubrication.

Since the first and second elements form the screw pump, and are provided separately from, i.e. in addition to, the driveshaft, they may be manufactured separately from other parts of the propeller drive assembly, including the driveshaft, and then joined to the rest of the assembly, e.g. as exemplified below. Thereby, material requirements for the first and second elements do not need to take driveshaft requirements into consideration, which may ensure a very low manufacturing cost.

In addition, since the one of the first and second elements is fixed to the driveshaft and presents the first elongated cavity forming a first helix so as to form with the other of the first and second elements the screw pump, the first helix moves with the drive shaft. This ensures a high efficiency of the screw pump. The thread pitch of the first helix may be optimized for an oil flow and pressure which is adapted to the particular implementation.

Since the first element extending through a first bore of the second element, and one of the first and second element presents the first helix, the first and second elements may constitute the screw pump as an item which is separate from other propeller drive assembly parts, again ensuring a possibility to facilitate a simple manufacturing. The invention may allow for adding the pump to earlier propeller drive assembly designs with no or only minor design alterations to the assembly, and may even allow for retrofitting propeller drive assemblies with the pump. Thus, the invention provides both efficiency and manufacturing benefits.

It is understood that that propeller drive assembly may include more than one driveshaft. Still the invention provides for presenting the first and second elements separately from any driveshaft of the assembly.

The benefits of the invention are particularly high where the driveshaft is non-horizontal, e.g. vertical. However, the invention is applicable to any orientation of the driveshaft.

Preferably, the first bore is concentric with the driveshaft. Thereby the interaction of the first and second elements while the pump is driven by the driveshaft is facilitated.

The invention may be implemented where the driveshaft presents a second bore extending inside and concentrically with the driveshaft. If thereby, the second element is fixed to the driveshaft, it may be easily placed within the driveshaft so that an external surface of the second element abuts an inner surface of second bore. Advantageously, the second element is press fitted to the driveshaft. The first element may extend at least partially inside and along the second bore. Thus, the driving of the pump by the driveshaft, which pump may be manufactured separately from the driveshaft, may be provided with a minimum of parts. I.e. no additional parts are needed to transfer the motion of the driveshaft to the pump. Also, placing the second element in the second bore of the driveshaft will place the pump in an advantageous location for pumping oil through the second bore, and it allows for the driveshaft diameter to not be limited by the pump arrangement.

The first element is herein also referred to as a first device and an assembled combination of the driveshaft and the second element is herein also referred to as a second device.

In some embodiments, the one of the first and second elements which is arranged to be stationary in relation to the housing presents in the first bore a second elongated cavity forming a second helix along the first bore, one of the first and second helices being left-handed and the other of the first and second helices being right handed. The second helix will improve the pumping capacity of the screw pump, since counter-oriented cavities are provided which enhance the pumping quantity.

In some embodiments, where the first element is arranged to be stationary in relation to the housing, the first element is arranged to be removable so as to provide an oil dipstick function. Thereby, the first element, which may be elongated, e.g. provided as a rod, may serve a double purpose of forming a part of the screw pump, and being used for oil level checks, e.g. during a service procedure. Thereby, the complexity of the propeller drive assembly may be further reduced.

According to another aspect of the invention, a propeller drive assembly is provided, the assembly comprising a driveshaft for transferring a torque between an engine and a propeller of a water surface vessel, wherein
the assembly comprises a first device and a second device, the second device comprises the driveshaft, the second device presenting a bore extending inside and concentrically with the driveshaft,
the first device extends through the bore and is arranged to be stationary in relation to the housing, and
the second device presents in the bore an elongated cavity forming a helix along the bore, so as to form with the first device a screw pump adapted to be driven by the driveshaft.

Including the driveshaft in the second device, providing a helix in the second device bore, and arranging the first device to extend through the bore of the driveshaft, will provide a screw pump in an advantageous location for pumping oil through the bore. Also, it allows for the driveshaft diameter to not be limited by the pump arrangement. The first device may be what is herein referred to as a first element, and the second device may be an assembled combination of the driveshaft and what is herein referred to as the second element. However, it is for this aspect of the invention possible to provide the second device as a unit which is manufactured as a single part, where the elongated cavity is formed in the driveshaft.

Further advantages and advantageous features of aspects of the invention are disclosed iii the following description.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
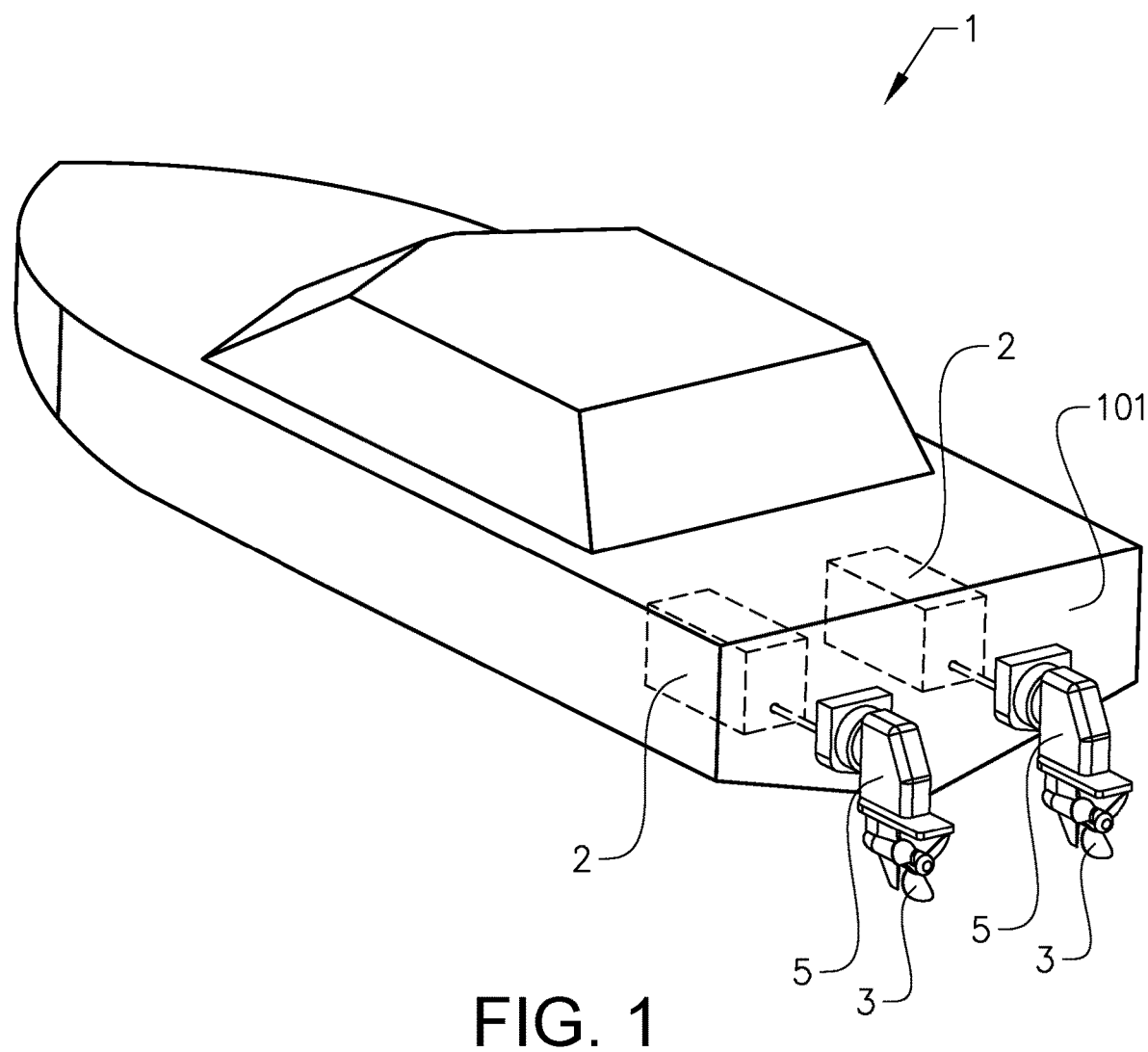
FIG. 1 is a perspective view of a water surface vessel in the form of a power boat with two engines.

It is to be understood that the present invention is not limited to the embodiments described above and illustrated in the drawings; rather, the skilled person will recognize that many changes and modifications may be made within the scope of the appended claims.

FIG. 1 shows a water surface vessel in the form of a power boat with two engines 2. Each engine 2 is adapted to drive a respective propeller 3 provided on a respective propeller drive assembly 5 in the form of a sterndrive 5. The sterndrives 5 are located side by side on a stern 101 of the vessel 1. The sterndrives 5 are distributed in a horizontal, lateral direction of the vessel 1.

Each sterndrive, or propeller drive assembly 5, comprises a plurality of driveshafts for transferring a torque between the respective engine 2 and the respective propeller 3.

Figure 2:
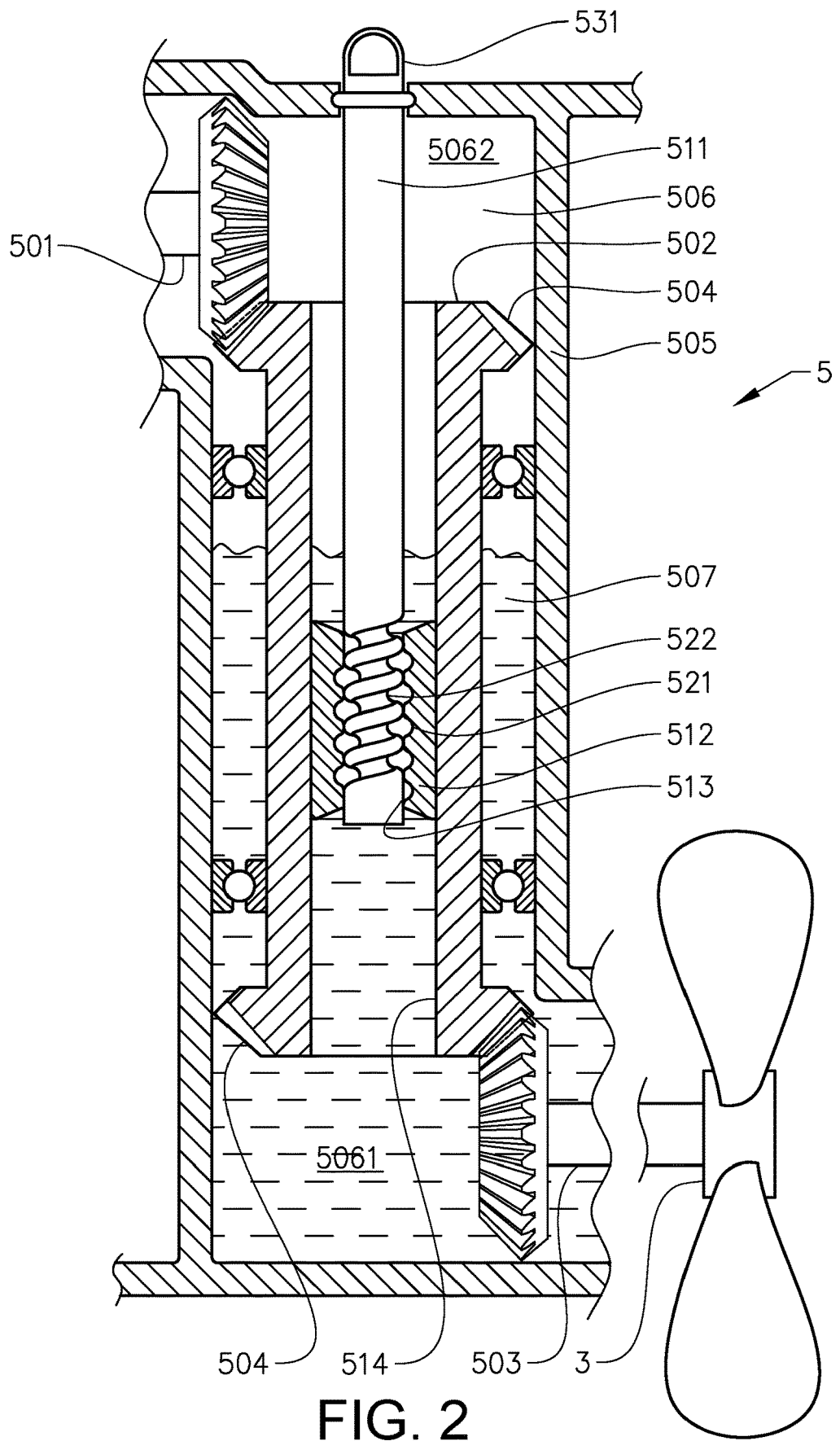
FIG. 2 is a partially sectioned view of a part of a propeller drive assembly of the vessel in FIG. 1.

FIG. 2 is a partially sectioned view of one of the propeller drive assemblies 5. Relationships between dimensions in FIG. 2 are provided for making the understanding of this presentation easy, and might not necessarily correspond to those in an actual implementation of an embodiment of the invention.

Torque from the engine 2 is transferred via a first, substantially horizontal driveshaft 501, a second, substantially vertical driveshaft 502, and a third, substantially horizontal driveshaft 503. Bevelled gears 504 are provided to transfer the torque from one driveshaft to another. The propeller is mounted on the third driveshaft 503.

The propeller drive assembly 5 also comprises a housing 505 enclosing the driveshafts 501, 502, 503. The housing forms a cavity 506 surrounding the second driveshaft 502. The cavity 506 is partly filled with a lubricating oil 507.

A screw pump 511, 512, described closer below, is arranged to pump the oil 507 from a lower part 5061 of the cavity to an upper part 5062 of the cavity. This is particularly useful during sailing, i.e. when the engine 2 is shut down, but the vessel is moving forward, e.g. by propulsion of the other engine 2.

Figure 3:
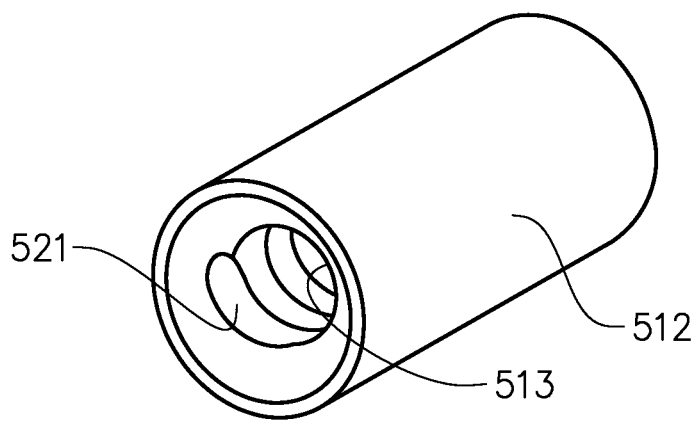
FIG. 3 is a perspective view of a first element of a screw pump of the propeller drive assembly in FIG. 2.
Figure 4:
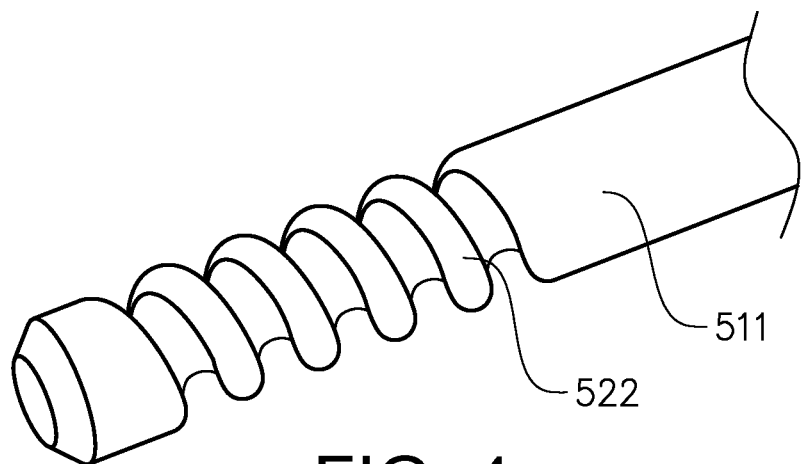
FIG. 4 is a perspective view of a second element of the screw pump of the propeller drive assembly in FIG. 2.
Figure 5:
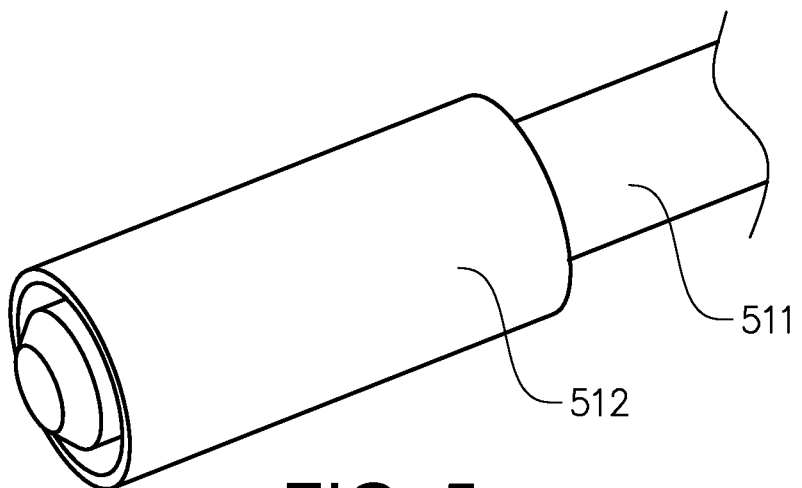
FIG. 5 is a perspective view of an assembled state of the first and second elements in FIG. 3 and FIG. 4.

Reference is made also to FIG. 3, FIG. 4 and FIG. 5. The screw pump 511, 512 comprises a first element 511 and a second element 512. The first and second elements 511, 512 are provided as elements which are manufactured separately from other parts of the propeller drive assembly 5, and then joined to the rest of the assembly 5 as described below. Accordingly, the second element is adapted to be provided as an element which is separate from the driveshaft. The second element is adapted to be fixed to a driveshaft, for example, to be press fitted to the driveshaft and/or adapted to be fixed inside a second bore presented by the driveshaft.

The second element 512 has a generally cylindrical shape, and resembles a bushing. The second element 512 is fixed to the second driveshaft 502. More specifically, the second driveshaft 502 presents a second bore 514 extending inside and concentrically with the second driveshaft 502, and the second element 512 is located inside the second bore 514. The second element 512 is press fitted in the second bore 514, whereby an external surface of the second element 512 abuts an inner surface of second bore 514. Thus, the second element 512 is arranged to rotate with the second driveshaft 502. The first bore 513 is concentric with the second driveshaft 502.

The first element 511 has an elongated shape, in this example the shape of a rod. Above the second driveshaft 502 the first element 511 is removably fixed to the housing 505 as described closed below. Thus, the first element 511 is arranged to be stationary in relation to the housing 505. The first element 511 extends in parallel with the second driveshaft 502. The first element 511 is thus also vertically oriented. The first element 511 is coaxial with the second driveshaft 501. The first element 511 extends partially inside and along the second bore 514 of the second driveshaft 502. The first element 511 extends through the first bore 513 of the second element 512.

In this example, during sailing, i.e. when the engine 2 is shut down, but the vessel is moving forward, e.g. by propulsion of the other engine 2, the second driveshaft 502 and the second element 512 rotate clockwise, as seen from below in FIG. 2. The reason for this rotation is that the propeller 3 is driven, i.e. rotates due to hydrodynamic pressure acting on its blades, as the vessel moves forward through the water.

As can be seen in FIG. 3, the second element 512 presents in the first bore 513 a first elongated cavity 521 forming a first helix along the first bore 513. The first helix is left handed. Thus, as the second driveshaft 502 and the second element 512 rotate clockwise, as seen from below in FIG. 2, oil is transported by the first elongated cavity 521 upwards in FIG. 2. Thereby, during sailing, oil is displaced in a direction from the lower part 5061 to the upper part 5062 of the cavity. Thereby, the second element forms with the first element 511 the screw pump.

Said oil displacement will ensure that parts of the propeller drive assembly 5 at the upper end of the second driveshaft 502 are lubricated during the sailing. It is understood that this oil transport by the screw pump is provided also when the propeller drive assembly is driven by the engine 2.

It should be noted that the first element 511 presents in the first bore 513 a second elongated cavity 522 forming a second helix along the first bore 513. The second helix is right handed. The second helix will improve the pumping capacity of the screw pump. It is however possible to provide the first element 511 without the second elongated cavity 522, i.e. with a cylindrical outer surface.

A gripping device 531 is fixed to the upper end of the first element 511. Thereby, a person can grab the dripping device 531 and pull the first element 511 upwards and out of the housing 505. Thus, the first element is removable so as to provide an oil dipstick function.

Figure 6:
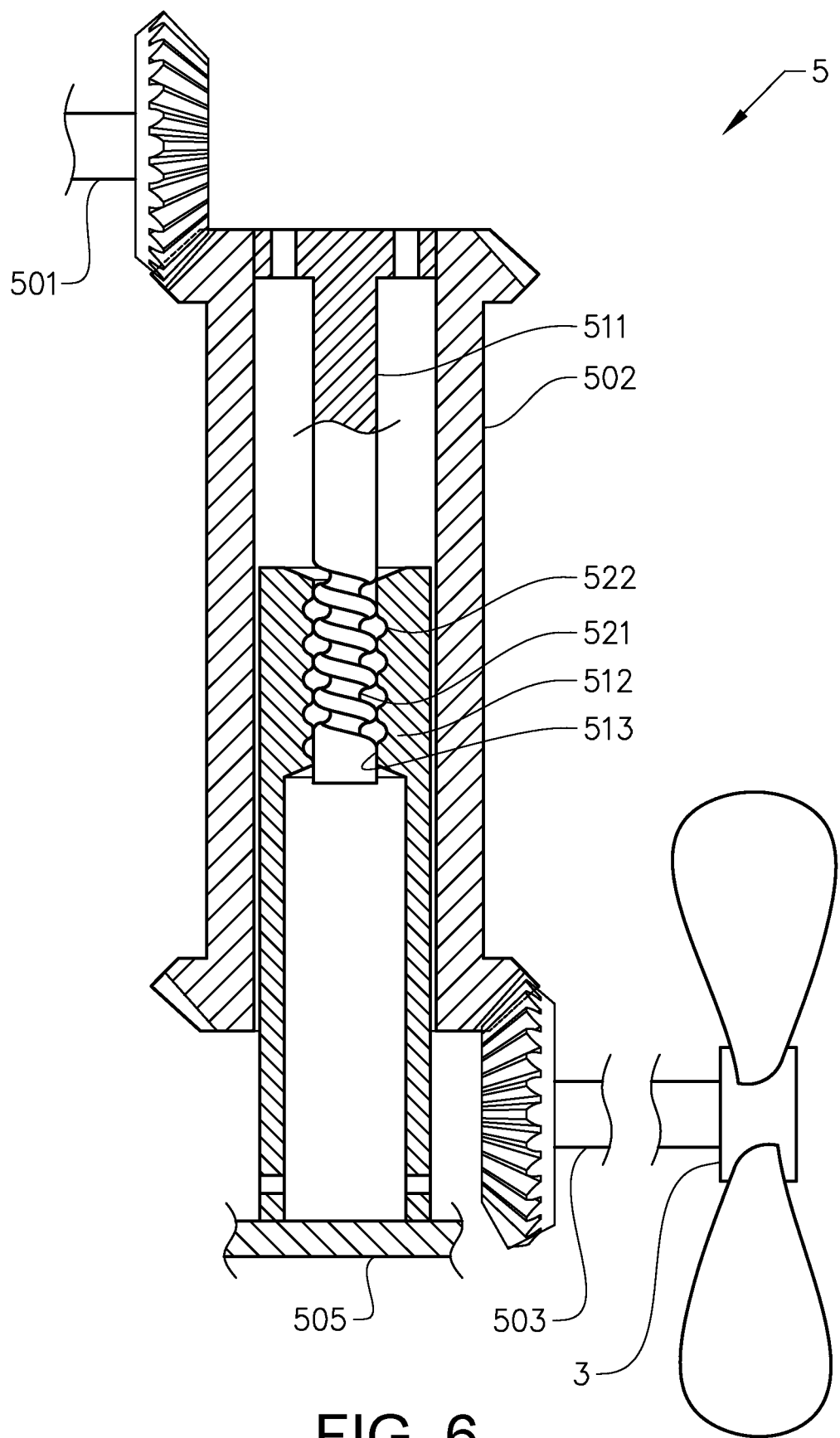
FIG. 6 is a partially sectioned view of a part of a propeller drive assembly according to an alternative embodiment of the invention.

Reference is made to FIG. 6 showing an alternative embodiment of the screw pump. In this embodiment, what is herein referred to as the first element 511 is fixed to the second driveshaft 502. More specifically, the first element 511 is located inside the second bore 514. As in the embodiment described above, the first element 511 has an elongated shape, extends in parallel with the second driveshaft 502, and is coaxial with the second driveshaft 501. An upper widened end of the first element 511 is press fitted in the second bore 514. Thus, the first element 511 is arranged to rotate with the second driveshaft 502.

The second element 512 has a generally cylindrical shape, and the first bore 513 is concentric with the second driveshaft 502. Below the second driveshaft 502 the second element 512 is fixed to the housing 505. Thus, the second element 512 is arranged to be stationary in relation to the housing 505. The first element 511 extends through the first bore 513 of the second element 512.

In this example, during sailing, i.e. when the engine 2 is shut down, but the vessel is moving forward, e.g. by propulsion of the other engine 2, the second driveshaft 502 and the second element 512 rotate clockwise, as seen from below in FIG. 2. The reason for this rotation is that the propeller 3 is driven, i.e. rotates due to hydrodynamic pressure acting on its blades, as the vessel moves forward through the water.

The first element 511 presents in the first bore 513 a first elongated cavity 521 forming a first helix along the first bore 513. The first helix is left handed. Thus, as the second driveshaft 502 and the first element 511 rotate clockwise, as seen from below in FIG. 2, oil is transported by the first elongated cavity 521 upwards in FIG. 2. Thereby, during sailing, oil is displaced in a direction upwards along the second driveshaft 502. Thereby, the first element 511 forms with the second element 512 a screw pump.

The second element 512 presents in the first bore 513 a second elongated cavity 522 forming a second helix along the first bore 513. The second helix is right handed. The second helix will improve the pumping capacity of the screw pump.

As in the embodiment described above with reference to FIG. 2-FIG. 5, the first and second elements 511, 512 are provided as elements which are manufactured separately from other parts of the propeller drive assembly 5, and then joined to the rest of the assembly 5.

The invention claimed is:

1. A propeller drive assembly, the propeller drive assembly comprising
a driveshaft for transferring a torque between an engine and a propeller of a water surface vessel, and
a housing enclosing the driveshaft,
wherein the propeller drive assembly comprises, separately from the driveshaft, a first element and a second element, the first element extending through a first bore of the second element,
wherein the second elements is fixed to the driveshaft and the first elements is arranged to be stationary in relation to the housing,
the second elements which is fixed to the driveshaft presents in the first bore a first elongated cavity forming a first helix along the first bore, so as to form with the first elements a screw pump, and
the driveshaft presents a second bore extending inside and concentrically with the driveshaft.

2. The propeller drive assembly according to claim 1, wherein the driveshaft is non-horizontal.

3. The propeller drive assembly according to claim 1, wherein the first bore is concentric with the driveshaft.

4. The propeller drive assembly according to claim 1, wherein an external surface of the second element abuts an inner surface of the second bore.

5. The propeller drive assembly according to claim 1, wherein the second element is press fitted to the driveshaft.

6. The propeller drive assembly according to claim 1, wherein the first element extends at least partially inside and along the second bore.

7. The propeller drive assembly according to claim 1, wherein the first elements which is arranged to be stationary in relation to the housing presents in the first bore a second elongated cavity forming a second helix along the first bore, one of the first and second helices being left-handed and the other of the first and second helices being right handed.

8. The propeller drive assembly according to claim 1, wherein the first element is arranged to be removable so as to provide an oil dipstick function.

9. A water surface vessel, comprising the propeller drive assembly according to claim 1.

10. A propeller drive assembly, the propeller drive assembly comprising a driveshaft for transferring a torque between an engine and a propeller of a water surface vessel, comprising
a first device and a second device,
wherein the second device comprises the driveshaft and a second element, the second device presenting a bore extending inside and concentrically with the driveshaft, wherein the first device extends through the bore and is arranged to be stationary in relation to the housing, wherein the second device presents in the bore an elongated cavity forming a helix along the bore, so as to form with the first device a screw pump adapted to be driven by the driveshaft, wherein the driveshaft presents a second bore extending inside and concentrically with the driveshaft, and wherein the second element is fixed to the driveshaft.

11. A water surface vessel, comprising the propeller drive assembly according to claim 10.

12. A screw pump comprising a first element and a second element, wherein the first element being arranged to extend through a bore of the second element, wherein the second element presents in the bore a first elongated cavity forming a first helix along the first bore, wherein the second element is adapted to be fixed to a driveshaft for transferring a torque between an engine and a propeller of a water surface vessel, wherein the first element is arranged to be stationary in relation to a housing enclosing the driveshaft, wherein the driveshaft presents a second bore extending inside and concentrically with the driveshaft, and wherein the second element is adapted to be fixed to the driveshaft.

13. A screw pump according to claim 12, wherein the second element is adapted to be provided as an element which is separate from the driveshaft.

14. A screw pump according to claim 12, wherein the second element is adapted to be press fitted to the driveshaft.

15. A screw pump according to claim 12, wherein the second element is adapted to be fixed inside a second bore presented by the driveshaft and extending inside and concentrically with the driveshaft.

* * * * *